Oct. 27, 1959 J. R. WIEGAND 2,910,654
INTERCEPTOR FREQUENCY CONVERTER
Filed Nov. 25, 1957 2 Sheets-Sheet 1

INVENTOR.
JOHN R. WIEGAND
BY
ATTORNEY

Oct. 27, 1959   J. R. WIEGAND   2,910,654
INTERCEPTOR FREQUENCY CONVERTER
Filed Nov. 25, 1957   2 Sheets-Sheet 2

INVENTOR.
JOHN R. WIEGAND
BY
ATTORNEY

United States Patent Office 2,910,654
Patented Oct. 27, 1959

2,910,654

INTERCEPTOR FREQUENCY CONVERTER

John R. Wiegand, Valley Stream, N.Y.

Application November 25, 1957, Serial No. 698,586

14 Claims. (Cl. 331—165)

This invention relates to improvements in interceptor transformers particularly useful as frequency conversion devices.

This application is an improvement over my prior Patent 2,798,987, issued July 9, 1957.

A principal object of the present invention is to provide a device capable of producing periodically recurring damped wave trains.

A further object is to provide a device capable of being driven by a low frequency A.C. input to produce in the output a high frequency carrier which appears to be modulated by a damped oscillation pattern of twice the input frequency.

A still further object is to provide an interceptor transformer including primary and secondary coils arranged in crossed positions one inside the other, with endless magnetic cores crossed and interwoven at the junctions of the crossed coils, the several cores being formed by strands of coiled magnetic wires.

Heretofore when telemetering or relaying functions were performed over single wire cables or two wire lines, the signal generators and band-pass filters used were rather bulky, complex and expensive, particularly when good frequency stability was desired. The present invention has made possible simplified telemetering and frequency conversion systems by providing a simple, low cost interceptor transformer device.

According to the invention, there are provided two flat circular or annular primary and secondary coils of insulated wire. The coils are arranged with their flat planes perpendicular (90°) to each other and with the planes intersecting in a common diametral region. The secondary coil is inside the primary coil. The geometric and magnetic axes of each coil coincide. The respective geometric-magnetic axes of the coils are thus disposed perpendicular to each other and pass through a common center at the midpoint of the common diameter. At the intersections of the coils are two pairs of crossed, interwoven magnetic cores formed of coils of magnetic wire. The cores may be made of the same material and have the same diameters, or the cores in each pair may differ in wire size, material, and/or diameter. The cores are preferably circular but may be elliptical, rectangular or have other endless annular forms.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
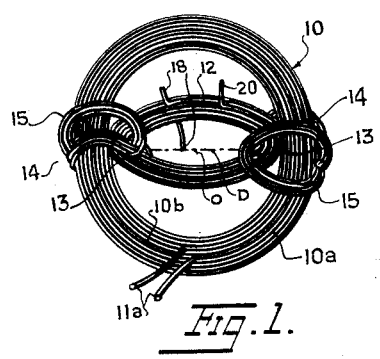
Fig. 1 is a perspective view of an interceptor transformer embodying the invention.
Figure 2:
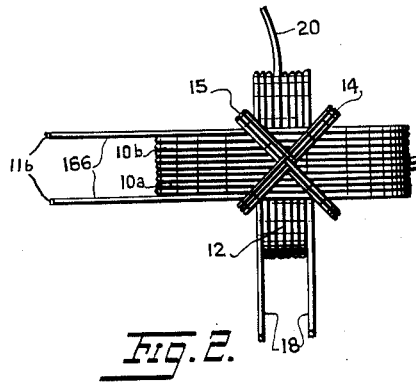
Fig. 2 is a plan view of the device showing crossed coils and cores embodying the invention.

The device shown in Figs. 1 and 2 includes an annular multiturn primary winding 10 having two identical sections $10^a$ and $10^b$. These sections have the same inductance, resistance and Q. The primary winding is a substantially flat circular coil of copper wire coated with a suitable insulation such as generally used in transformer windings. This coil has four terminals 11. There are two inner terminals $11^a$ and two outer terminals $11^b$. An annular secondary winding 12 which is another substantially flat circular coil of insulated copper wire is disposed inside and 90° to the primary winding and is glued thereto by adhesive 13 at the opposite ends of a common diametral region or common diameter D. The flat planes or faces of the two coils are thus dispposed perpendicular to each other. The magnetic and geometric axes of primary coil 10 coincide; and the magnetic and geometric axes of secondary coil 12 coincide. The axes of coils 10 and 12 intersect at an angle of ninety degrees at the center or modpoint O of the coil structure and diameter D. Coil 12 has terminals 18 and a center tap 20. The coils may each be circular in transverse and longitudinal section.

Figure 3:
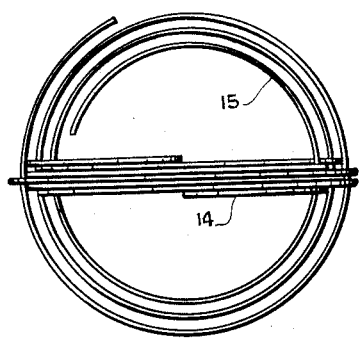
Fig. 3 is a side view of a pair of magnetic cores in one arrangement which may be used in the transformer.

A pair of endless magnetic cores 14 and 15 and another pair of similar endless magnetic cores are each interwoven and linked together and encircle the intersections of the coils at the ends of the diametral region D. The substantially flat planes of the cores are disposed perpendicular to each other, as best shown in Fig. 2, and the planes of the cores are substantially forty-five degrees to the substantially flat planes of the respective coils 10 and 12. The several cores may be flat and circular in form as best shown in Figs. 2 and 3 but they may have other endless annular forms such as elliptical, rectangular, square, etc. In transverse section the cores should have regular symmetrical shapes such as circular, elliptical, rectangular or square.

In Fig. 3 cores 14 and 15 are shown in side view with coils 10 and 12 omitted. It will be noted that the spirally wound cores intersect at the ends of a common diametral region. Each core intersects the other core twice. In general, the magnetic and geometric axes of any one core coincide and the axes of the cores in each pair are disposed perpendicular to each other and intersect at the line of intersection of the central planes of the cores.

The crossing of the coils, the interweaving and crossing of the cores with each other and the encircling of the coils by the cores insure substantially balanced magnetic fields in the coils influenced by the magnetic cores, as will be described with references to Figs. 4, 5 and 6.

Figure 5:
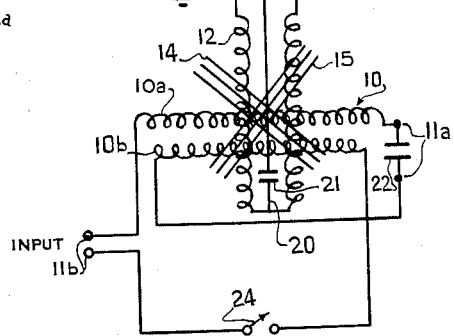
Fig. 5 is a schematic representation of the interceptor transformer arranged for performing a frequency conversion function.

In Fig. 5, the transformer is represented schematically, with coils 10 and 12 disposed perpendicular to each other. The magnetic cores 14, 15 are represented at angles of forty-five degrees to the several coils. A condenser 21 is connected between the center tap 20 and one of the terminals 18 of the secondary coil which is grounded at 23. Condenser 21 is thus connected in parallel with each half of coil 12 between the center tap and one of terminals 18. Another condenser 22 is connected between terminals $11^a$. This condenser is in series with the coil sections $10^a$ and $10^b$. Condenser 22 serves to tune coil 10 to the input frequency of the voltage applied at terminals 11b. Condenser 21 serves to tune coil 12 to the output frequency of the transformer. A switch 24 may be provided in series with input terminals 11b of primary coil 10.

Figure 6:
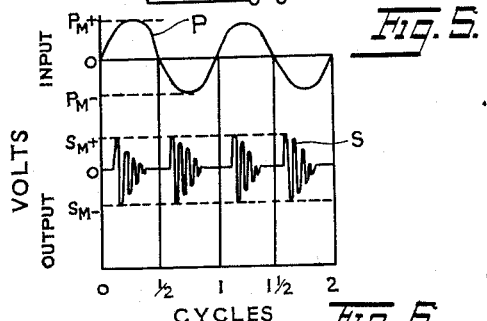
Fig. 6 is another graphic diagram useful in explaining the invention.

Fig. 6 shows graphically the effects obtained when an alternating line voltage is applied at terminals 11b. This voltage may be 115 volts A.C., sixty cycles per second. The periodic sinusoidal voltage applied at terminals 11b is represented as curve P which alternates between maximum positive voltage $P_{M+}$ and maximum negative voltage $P_{M-}$. If an oscilloscope is connected to terminals 18 of the secondary coil 12, an output voltage is obtained which is periodic or repeats each one half cycle of the primary voltage. The secondary output is a damped wave S alternating between maximum positive and negative voltages $S_{M+}$ and $S_{M-}$, respectively. The secondary output has a repetition frequency of twice the input frequency. This condition obtains whether the input is 25, 50, 60, 400, 1000 or any other desired input frequency. The output voltage has a carrier frequency principally determined by the size of the condenser 21, and inductance of the secondary coil. The carrier frequency of the secondary voltage may range from 200 c.p.s. to fifty kilocycles or more. It is preferred that the coils and cores be magnetically balanced. The symmetrical geometric structure will produce this magnetic balance and insure that the wave shape of the output voltage will be substantially the same in the successive half cycles of the primary input voltage.

Figure 4:
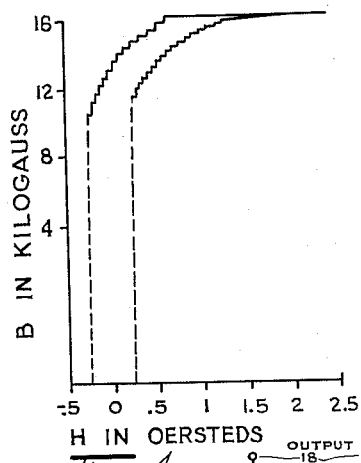
Fig. 4 is a graphic diagram useful in explaining the invention.

Fig. 4 shows the upper portion of idealized hysteresis loop which represents magnetic flux measurements made of one of the cores 14 or 15 when the interceptor transformer is arranged as shown in Fig. 5. In operation, the cores 14 and 15 are used between start of saturation and full saturation. Similar to the Barkhausen effect (i.e., magnetism in small wire does not proceed uniformly but in small discrete steps). The interceptor effect, especially when cores 14 and 15 are meshed into each other as shown in Fig. 3, showed that magnetism in small wire cores does not proceed uniformly either into saturation or out of saturation. This non-uniform action can be controlled by condenser 21 since the two cores, the positive and the negative cores of the primary coil 10, go through the secondary coil 12 with equal strength. Now when saturation begins, one of the cores 14 or 15 induces current in the secondary coil 12, and the condenser 21 surges this current back as in a "tank." This action accelerates saturation in one core and slows saturation in the other and, in effect, makes a connection between primary and secondary, since before this action the cores were neutralized. A very large voltage now surges in the "tank," producing the same action as before. This action goes on at the rate of the "tank frequency" until the cores are fully saturated, producing the steps indicated roughly at the "knee" of the upper half curve shown in Fig. 4.

In operation, it is believed that one core of each pair of cores which initially has a lesser amount of magnetic flux, gains continuously in flux at a faster rate and reduces the flux in the other core, during each half cycle of the primary current so that saturation of the one core occurs earlier than saturation of the other core during that half cycle. Each of the discrete changes in magnetization of the one core which is close to the knee of the hysteresis loop causes a further discrete damping of the secondary voltage until maximum saturation of the one core occurs at the end of the half cycle. When the primary voltage reverses at the end of each half cycle, the secondary voltage also reverses and the control of damping of the secondary voltage is then exercised by the other core which is now at a point of minimum magnetization. The device thus acts like a self-triggered magnetic amplifier. It is important that substantially no difference in magnetic flux exists between the two cores and if an imbalance exists due to one core having greater flux path length it is corrected by using wire of different material, different longitudinal or transverse diameter, etc.

The interceptor transformer is intended to operate with any generally available alternating line voltage as the primary input having a frequency such as 25, 50, 60, 400, 1000 c.p.s. and the like. This low frequency is converted into a higher frequency output consisting of damped pulses which have particular utility in telemetering, remote control of relay apparatus over land lines, etc. Certain magnetic amplifiers, recorder amplifiers, etc. are especially adapted to use pulsed inputs and the damped oscillation patterns provided by the present invention are highly desired as input sources for these amplifiers. It will be noted that the interceptor transformer according to the invention accomplishes frequency conversion without use of components such as transistors, diodes, and other active elements which are subject to steady deterioration during use. The rugged construction of the present transformer insures a long, trouble-free, useful life.

It is important to note that the magnetic cores are magnetically symmetrically balanced with respect to the primary coil at its working frequency and ampere-turns even though one core may have a longer magnetic flux path or may have a larger transverse or longitudinal diameter than the other. Any imbalance in the magnetic field is corrected by using more turns, different magnetic material, etc. in the several cores. In construction of the cores, coiled wire is preferably used rather than a single solid piece of magnetic material. It has been found that the Barkhausen effect appears more pronounced at the knees of the hysteresis curves when the cores have wire structures. The increased Barkhausen effect is believed due to the presence in the wires of a definite grain structure in which the molecules have a more uniform orientation so that when the magnetizing force changes direction, a more uniform and pronounced change in molecular orientation must take place.

For output carried frequencies ranging approximately from 1200 to 2000 cycles per second, a suitable type of wire for forming the cores is #40 gauge wire containing 52% nickel and 48% iron. Each core may have about ninety turns intermeshed twice with the intersecting core. The average flux path of one core may be about 1¼ inches in length and the other core may have an average flux path length ranging from ten to thirty percent greater or less.

Magnetic balancing of the cores has been found to result in a reduction of the inductive impedance measurable at the output terminals 18 of the circuit in Fig. 5, to substantially zero. Thus, the secondary winding may be nominally rated as purely resistive and can be operated as a frequency generator over a line, without material change in power factor. Interceptor transformers embodying the invention have been produced with output capacities ranging from one milliwatt to twenty watts. Using larger condensers 21 in the "tank" circuit 12 of Fig. 1 and increasing the ampere-turns of the primary and secondary coils increases the output capability.

The coil and core structure forms a unitary rigid body because of the intermeshing of the coil turns with each other and the core turns with each other. Also the cores 14 and 15 are arranged to embrace the crossed coils snugly. The assembled coil and core structure may be potted in a casing in conventional manner with terminals 11, 18 and 20 brought out of the casing for making circuit connections thereto.

Figure 7:
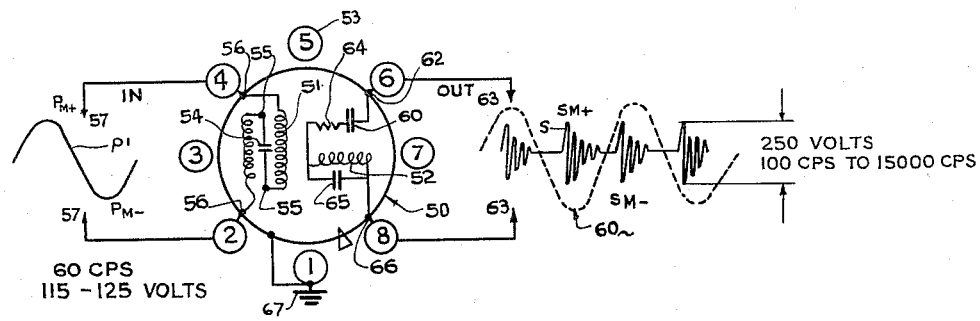
Figs. 7, 8 and 9 are schematic and graphic views of modified interceptor transformers with sockets showing the associated circuits and magnetic fields and the effects produced when an alternating current is applied at the input terminals.

In the modification illustrated in Fig. 7, the interceptor or reformer is of the high impedance type and is shown with a socket member 50 housing a sectioned primary winding 51 and a secondary winding 52. The socket has eight socket openings indicated at 53 and numbered from "1" to "8" consecutively. A condenser 54 is connected between the inner terminals 55, 55 of the primary winding 51. The outer terminals 56, 56 of the primary winding are connected to the terminals 57, 57 of the input frequency circuit in the socket openings marked "2" and "4."

In the output circuit, a condenser 60 is connected between one end of the secondary winding 52 and a terminal 62 in the socket opening marked "6" at which point it is connected to one of the output terminals 63 of the output circuit. A resistance or impedance element 64 is interposed between the condenser 60 and the end of the secondary winding 52.

Another condenser 65 is connected across the ends of the secondary winding 52 and is connected to a terminal 66 in the socket opening marked "8" at which point it is connected to the other output terminal 63 of the output frequency circuit. The secondary winding is grounded at 67.

Condenser 54 serves to tune the primary winding 51 to the input frequency of the voltage applied at the terminals 57. Condensers 60 and 65 serve to tune the secondary winding 52 to the output frequency of the transformer. The socket openings marked "1," "3," "5" and "7" serve as guide openings.

The graph at the right of Fig. 7 shows the effects obtained when an alternating line voltage is applied at terminals 57, 57 which voltage may be 115–125 volts A.C., sixty cycles per second. The periodic sinusoidal voltage applied at terminals 57, 57 is represented as curve P' which alternates between maximum positive voltage $P_{M+}$ and maximum negative voltage $P_{M-}$. If an oscilloscope is connected to the socket terminals 62 and 66 in the socket openings marked "6" and "8" respectively, an output voltage is obtained which is periodic or repeats each one half cycle of the primary voltage. The secondary output is a damped wave S alternating between maximum positive and negative $S_{M+}$ and $S_{M-}$, respectively. The secondary output has a repetition frequency of twice the input frequency. This condition obtains no matter what the input frequency. The output voltage has a carrier frequency principally determined by the size of the condensers 60 and 65 and inductance of the secondary winding. The carrier frequency of the secondary voltage may range from 100 c.p.s. to 15,000 c.p.s. This arrangement produces a stepped-up high impedance of 250 volts.

Figure 8:
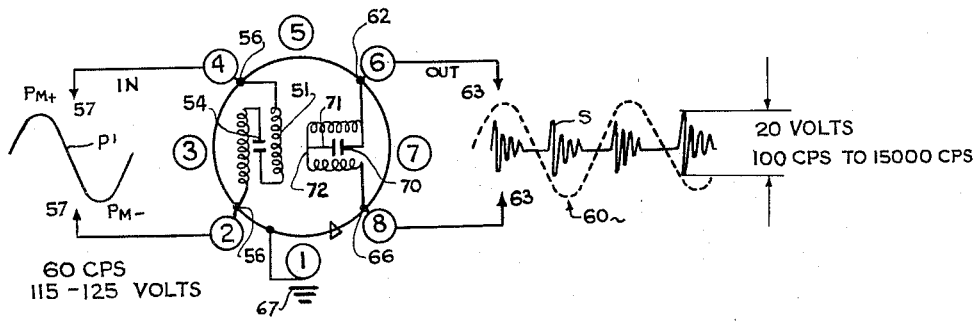

The low impedance type of transformer shown in Fig. 8 differs from the form of transformer shown in Fig. 7 in that a single condenser 70 is connected between the center tap 71 and the terminal 62 of the secondary winding 72. The impedance or resistance 64 of Fig. 7 is omitted in this transformer. This transformer reduces the voltage to 20 volts, with the carrier frequency of the secondary voltage ranging from 100 c.p.s. to 15,000 c.p.s.

Figure 9:
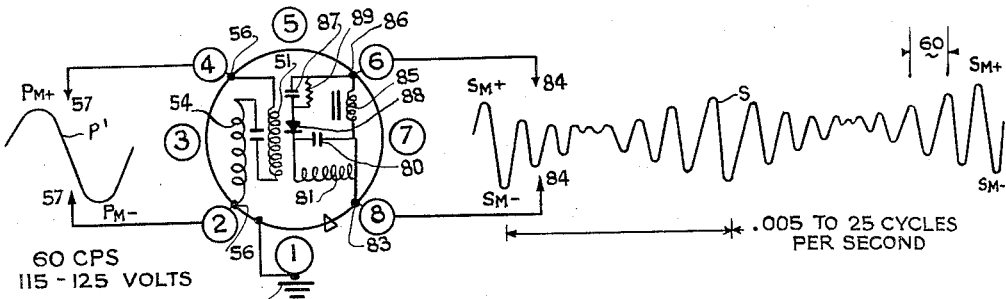

The modified transformer shown in Fig. 9 produces a reduction in the carrier frequency from 60 c.p.s. to .005–25 c.p.s. In this form of transformer, the input frequency circuit is similar to that of the forms of Figs. 7 and 8 and similar reference numerals are used to indicate similar parts.

In the output frequency circuit, however, a condenser 80 is connected across the ends of the secondary winding 81. The secondary winding 81 is grounded at 82. One end of the secondary winding is connected to the terminal 83 in the socket opening "8" at which point it is connected to one of the output frequency circuit terminals 84. A fixed inductance 85 is connected between the end of the secondary winding 81 that is connected to terminal 83, and the terminal 86 in the socket opening "6" at which point said terminal is connected to the other output frequency terminal 84. Another condenser 87 is connected between the other end of the secondary winding 81 and the terminal 86 in the socket opening "6," and interposed between said condenser 87 and the latter end of the secondary winding 81 is a rectifier 88. A resistance element 89 is connected between the terminal 86 and rectifier 88.

This transformer produces a secondary output in the form of a damped wave S alternating between maximum positive and negative voltages $S_{M+}$ and $S_{M-}$, respectively. The output voltage carrier frequency produced by the condensers and resistance elements together with the inductance of the secondary coil, in accordance with the invention, amounts to a reduction from the 60 c.p.s. applied at the input terminals 57 to .005–25 c.p.s. at the output terminals 84.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A frequency converter, comprising an annular coil having a pair of input terminals for applying an alternating voltage thereto, another annular coil having a pair of output terminals, said coils being formed of insulated wire, one coil being disposed inside the other and intersecting the other at the ends of a common line of intersection of the face planes of the coils, a first pair of magnetic cores encircling one intersection of the coils and another pair of magnetic cores encircling the other intersection of the coils, said cores having endless annular forms, the cores in each pair of cores intersecting each other at two spaced points.

2. A frequency converter, comprising an annular coil having two identical sections with two pairs of terminals, one pair of said terminals being input terminals for applying an alternating voltage thereto, another annular coil having a pair of output terminals and a center tap, said coils being formed of insulated wire, said coils intersecting each other at the ends of a common line of intersection of the face planes of the coils, a first condenser connected between said output terminals in parallel with each half of said other coil, a second condenser connected to another pair of said pairs of terminals in series with each of said sections and said one pair of terminals, a first pair of magnetic cores encircling one intersection of the coils and another pair of magnetic cores encircling the other intersection of the coils, said cores having endless annular forms, the cores in each pair of cores intersecting each other at two spaced points, whereby application of an alternating voltage of one certain frequency to said input terminals produces a series of periodically recurring pulses at another frequency twice said one certain frequency, each of said pulses being a damped wave train having a carrier frequency higher than said other frequency.

3. A frequency converter, comprising a flat annular coil having a pair of input terminals for applying an alternating voltage thereto, a flat annular coil having a pair of output terminals, said coils being formed of insulated wire and intersecting each other at the ends of a common line of intersection of the face planes of the coils, said face planes being disposed perpendicular to each other, a first condenser connected between said output terminals, a second condenser connected in series with the input terminals, a first pair of magnetic cores encircling one intersection of the coils and another pair of magnetic cores encircling the other intersection of the coils, said cores having endless annular forms, the cores in each pair of cores intersecting each other at two spaced points to form a symmetrical field, whereby application of an alternating voltage of one certain frequency to said input terminals produces a series of periodically recurring pulses at another frequency twice said one certain frequency, each of said pulses being a damped wave train having a carrier frequency higher than said other frequency.

4. A frequency converter, comprising an annular coil having two identical sections with two pairs of terminals, one pair of said terminals being input terminals for applying an alternating voltage thereto, another annular coil having a pair of output terminals and a center tap, said coils being formed of insulated wire, said coils intersecting each other at the ends of a common line of intersection of the face planes of the coils, a first condenser connected between said output terminals in parallel with each half of said other coil, a second condenser connected to another pair of said pairs of terminals in series with each of said sections and said one pair of terminals, a first pair of magnetic cores encircling one intersection of the coils and another pair of magnetic cores encircling the other intersection of the coils, said cores being formed of magnetic wire wound into endless, flat annular forms, the cores in each pair of cores being interwoven and intersecting each other at two spaced points, one core in each pair of cores having a differently shaped magnetic flux path from the flux path in the other core in said pair of cores to form a balanced magnetic field.

5. A frequency converter, comprising a substantially flat annular primary coil having a pair of terminals for applying an alternating voltage thereto, a substantially flat annular secondary coil disposed inside the primary coil having a pair of output terminals, said coils intersecting each other at the ends of a common line of intersection of the face planes of the coils, said face planes being disposed perpendicular to each other, a first pair of magnetic cores encircling one intersection of the coils and another pair of magnetic cores encircling the other intersection of the coils, said cores being formed of magnetic wire wound into endless annular forms, the cores in each pair of cores being interwoven and intersecting each other at two spaced points.

6. A frequency converter, comprising a substantially flat annular primary coil having a pair of terminals for applying an alternating voltage thereto, a substantially flat annular secondary coil having a pair of output terminals, said coils intersecting each other at the ends of a common line of intersection of the face planes of the coils with one coil being inside the other coil, said face planes being disposed perpendicular to each other, a first pair of magnetic cores encircling one intersection of the coils and another pair of magnetic cores encircling the other intersection of the coils, said cores being formed of magnetic wire wound into endless, flat, annular forms, the cores in each pair of cores being interwoven and intersecting each other at two spaced points, the face planes of the cores being disposed at angles of forty-five degrees to the face planes of the coils.

7. A frequency converter, comprising a substantially flat sectional annular primary coil having a pair of terminals for applying an alternating voltage thereto, a substantially flat annular secondary coil having a pair of terminals and a center tap, one of said coils being disposed inside the other coil, said coils intersecting each other at the ends of a common line of intersection of the face planes of the coils, said face planes being disposed perpendicular to each other, a first condenser connected between said center tap and one of the pair of terminals of said secondary coil, a second condenser connected in series with the sections of the primary coil, a first pair of magnetic cores encircling one intersection of the coils and another pair of magnetic cores encircling the other intersection of the coils, said cores being formed of magnetic wire wound into endless, flat annular forms, the cores in each pair of cores being interwoven and intersecting each other at two spaced points, the face planes of the cores being disposed at angles of forty-five degrees to the face planes of the coils, one core in each pair of cores having a longer magnetic flux path than the other core in said pair of cores, said cores being magnetically balanced with respect to said coils.

8. A frequency converter, comprising a substantially flat circular annular coil having two identical sections with two pairs of terminals, one pair of said terminals being input terminals for applying an alternating voltage thereto, another endless flat annular circular coil having a pair of output terminals and a center tap, said coils being formed of insulated wire, said coils having flat face planes intersecting each other at the ends of a common line of intersection of the face planes of the coils, each of the coils having coinciding magnetic and geometric axes, the axes of the coils intersecting at the midpoint of a common diametral region, a first condenser connected between said output terminals in parallel with each half of said other coil, a second condenser connected to another pair of said pairs of terminals in series with each of said sections and said one pair of terminals, a first pair of substantially flat magnetic cores encircling one intersection of said coils, and another pair of substantially flat magnetic cores encircling the other intersection of said coils, each of the cores being formed of magnetic wire wound into an endless annular form, the cores in each pair of cores being interwoven at two spaced points, and being arranged so that each pair of cores snugly embraces the encircled coils, the cores in each pair of cores having flat face planes disposed perpendicular to each other, the flat face planes of the cores being all disposed at angles of forty-five degrees to the flat face planes of the coils.

9. A frequency converter, comprising an annular coil having two identical sections with two pairs of terminals, one pair of said terminals being input terminals for applying an alternating voltage thereto, another annular coil having a pair of output terminals and a center tap, said coils being formed of insulated wire, a first condenser connected between said output terminals in parallel with each half of said other coil, a second condenser connected to another pair of said pairs of terminals in series with each of said sections and said one pair of terminals, said coils having their flat face planes disposed perpendicular to each other, each of the coils having coinciding magnetic and geometric axes, the axes of the coils intersecting at the mid-point of said common diametral region, a first pair of substantially flat magnetic cores encircling one intersection of said coils, and another pair of substantially flat magnetic cores encircling the other intersection of said coils, each of the cores being formed of magnetic wire wound into an endless annular form, the cores in each pair of cores being interwoven at two spaced points, and being arranged so that each pair of cores snugly embraces the encircled coils, the cores in each pair of cores having flat face planes disposed perpendicular to each other, the flat face planes of the cores being all disposed at angles of forty-five degrees to the flat face planes of the coils, the annular form of the cores being substantially circular in longitudinal and transverse section.

10. A frequency converter, comprising a substantially flat annular primary coil formed of insulated wire and having a pair of terminals, a substantially flat annular secondary coil formed of insulated wire and having a second pair of terminals with a center tap, said secondary coil being disposed inside and intersecting the primary coil at the ends of a common diametral region, said coils having their flat face planes disposed perpendicular to each other, each of the coils having coinciding magnetic and geometric axes, the axes of the coils intersecting at the mid-point of said common diametral region, a first pair of substantially flat magnetic cores encircling one intersection of said coils, and another pair of substantially flat magnetic cores encircling the other intersection of said coils, each of the cores being formed of magnetic wire wound into an endless annular form, the cores in each pair of cores being interwoven at two spaced points, and being arranged so that each pair of cores snugly embraces the encircled coils, the cores in each pair of cores having flat face planes disposed perpendicular to each other, the flat face planes of the cores being all disposed at angles of forty-five degrees to the flat face planes of the coils, the annular form of the coils being circular in longitudinal and transverse section.

11. In an interceptor frequency transformer, a socket housing a primary winding and a secondary winding, said primary winding including an annular coil with two pairs of terminals, one pair of said terminals being input terminals for applying an alternating voltage thereto, said secondary winding including another annular coil having a pair of output terminals, a first condenser connected across the ends of said other coil, said first condenser being connected to one of said output terminals, a second condenser connected across one end of said other coil and one of said output terminals, said second condenser being connected to the other of said output terminals, and a resistance element interposed between one end of said other coil and said second condenser.

12. In an interceptor frequency transformer, a socket housing a primary winding and a secondary winding, said socket having a plurality of socket openings therearound, said primary winding including an annular coil with two pairs of terminals, one pair of said terminals being input terminals in a pair of socket openings, for applying an alternating voltage thereto, said secondary winding including another annular coil having a pair of output terminals in a pair of socket openings, a condenser connected across the ends of said other coil, said first condenser being connected to one of said output terminals, a condenser connected across one end of said other coil and one of said output terminals, said latter condenser being connected to the other of said output terminals, and a resistance element interposed between one end of said other coil and said latter condenser, others of said socket openings serving as guides.

13. In an interceptor frequency transformer, a socket housing a primary winding and a secondary winding, said socket having a plurality of socket openings therearound, said primary winding including an annular coil with two pairs of terminals, one pair of said terminals being input terminals in a pair of socket openings for applying an alternating voltage thereto, said secondary winding consisting of another annular coil having a pair of output terminals in a pair of socket openings, and a condenser connected between a center tap on said secondary winding and one of the output terminals of said secondary winding.

14. In an interceptor frequency transformer, a socket housing a primary winding and a secondary winding, said socket having a plurality of socket openings therearound, said primary winding including an annular coil with two pairs of terminals, one pair of said terminals being input terminals in a pair of socket openings for applying an alternating voltage thereto, said secondary winding consisting of another annular coil having a pair of output terminals in a pair of socket openings, a first condenser connected across the ends of said secondary winding, said condenser being connected to one of said output terminals, a fixed inductance connected across said first condenser and the other output terminal of said secondary winding, a second condenser connected between said other output terminal of the secondary winding and the end of the secondary winding, a variable condenser connected between said second condenser and said other end of the secondary winding and a resistance element connected across said second condenser and said variable condenser.

References Cited in the file of this patent

UNITED STATES PATENTS

| | | |
|---|---|---|
| 1,613,772 | Schmidt | Jan. 11, 1927 |
| 2,445,857 | McCreary | July 27, 1948 |
| 2,740,096 | Weigand | Mar. 27, 1956 |